United States Patent
He et al.

(10) Patent No.: US 9,936,143 B2
(45) Date of Patent: Apr. 3, 2018

(54) IMAGER MODULE WITH ELECTRONIC SHUTTER

(75) Inventors: Fan He, Gurnee, IL (US); Michael Frenzer, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1138 days.

(21) Appl. No.: 11/931,828

(22) Filed: Oct. 31, 2007

(65) Prior Publication Data

US 2009/0109309 A1 Apr. 30, 2009

(51) Int. Cl.
*H04N 5/235* (2006.01)
*G02B 13/00* (2006.01)
*G03B 37/00* (2006.01)

(52) U.S. Cl.
CPC ......... *H04N 5/2353* (2013.01); *G02B 13/001* (2013.01); *G03B 37/00* (2013.01)

(58) Field of Classification Search
CPC .. H04N 5/2251–5/2257; H04N 5/2353; H04N 9/643; H04N 5/2351; H04N 5/2354; H04N 9/045; H04N 5/238; G03B 37/00; G02B 13/001
USPC ................ 348/296, 297, 362–369
See application file for complete search history.

(56) References Cited

U.S. PATENT DOCUMENTS

| | | | |
|---|---|---|---|
| 4,881,127 A * | 11/1989 | Isoguchi et al. | 348/296 |
| 5,294,990 A | 3/1994 | Aoki et al. | |
| 5,505,199 A | 4/1996 | Kim | |
| 5,909,246 A * | 6/1999 | Terashima | 348/298 |
| 6,167,356 A | 12/2000 | Squadron et al. | |
| 6,347,925 B1 * | 2/2002 | Woodard et al. | 417/51 |
| 6,377,383 B1 * | 4/2002 | Whitehead | B29C 59/16 359/222.1 |
| 6,529,253 B1 * | 3/2003 | Matsute | 349/96 |
| 6,614,471 B1 | 9/2003 | Ott | |
| 7,190,263 B2 | 3/2007 | McKay et al. | |
| 7,301,563 B1 | 11/2007 | Kakinuma et al. | |
| 7,414,665 B2 * | 8/2008 | Watanabe et al. | 348/363 |
| 7,450,187 B2 * | 11/2008 | Sun | 349/2 |
| 8,295,631 B2 | 10/2012 | Adams et al. | |
| 8,619,128 B2 | 12/2013 | Bilbrey et al. | |

(Continued)

FOREIGN PATENT DOCUMENTS

| | | |
|---|---|---|
| EP | 2043360 | 4/2009 |
| EP | 2645700 | 3/2012 |

(Continued)

OTHER PUBLICATIONS

"Non-Final Office Action", U.S. Appl. No. 14/450,390, dated Apr. 8, 2016, 10 pages.

(Continued)

*Primary Examiner* — Roberto Velez
*Assistant Examiner* — Tuan Le
(74) *Attorney, Agent, or Firm* — Colby Nipper (57) ABSTRACT

A method and apparatus are provided for operating a camera. The method includes the steps of providing an array of image sensing pixels, disposing an electronic shutter in an optical path between the array of pixels and an image where the electronic shutter has a reflective state and a transmissive state and applying a predetermined sequence of electrical signals to the electronic shutter to expose the image sensing pixels to the image.

22 Claims, 9 Drawing Sheets

(56) References Cited

U.S. PATENT DOCUMENTS

| | | | |
|---|---|---|---|
| 8,803,985 B2 | 8/2014 | Kaizu et al. | |
| 9,117,483 B2 | 8/2015 | Zaletel | |
| 9,143,749 B2 | 9/2015 | Wernersson | |
| 9,325,876 B1 | 4/2016 | Terrill et al. | |
| 9,344,639 B2 | 5/2016 | Musatenko et al. | |
| 9,357,127 B2 | 5/2016 | Lameer et al. | |
| 9,392,322 B2 | 7/2016 | Thorson | |
| 9,413,947 B2 | 8/2016 | Waddington | |
| 9,654,700 B2 | 5/2017 | Kovtun et al. | |
| 2002/0047909 A1* | 4/2002 | Hatae | H04N 5/235 348/222.1 |
| 2002/0080263 A1* | 6/2002 | Krymski | 348/364 |
| 2002/0196345 A1* | 12/2002 | No | H04N 1/00519 348/207.2 |
| 2003/0007088 A1* | 1/2003 | Rantanen et al. | 348/371 |
| 2003/0020827 A1* | 1/2003 | Bean | H04N 5/238 348/363 |
| 2003/0052989 A1* | 3/2003 | Bean et al. | 348/362 |
| 2004/0107103 A1 | 6/2004 | Iyengar et al. | |
| 2005/0154318 A1 | 7/2005 | Sato et al. | |
| 2005/0206820 A1* | 9/2005 | Palmer | G02F 1/134309 349/139 |
| 2006/0156374 A1 | 7/2006 | Hu et al. | |
| 2006/0216434 A1* | 9/2006 | Okuyama | C09K 19/544 428/1.1 |
| 2007/0090283 A1* | 4/2007 | Linke | G02B 26/004 250/237 R |
| 2007/0115459 A1 | 5/2007 | Nakao et al. | |
| 2007/0201815 A1 | 8/2007 | Griffin | |
| 2007/0237423 A1 | 10/2007 | Tico et al. | |
| 2008/0077020 A1 | 3/2008 | Young et al. | |
| 2009/0086074 A1 | 4/2009 | Li et al. | |
| 2009/0087099 A1 | 4/2009 | Nakamura | |
| 2009/0115861 A1 | 5/2009 | Mochizuki | |
| 2009/0189992 A1 | 7/2009 | Zhang et al. | |
| 2009/0190803 A1 | 7/2009 | Neghina et al. | |
| 2009/0291707 A1 | 11/2009 | Choi | |
| 2010/0091119 A1 | 4/2010 | Lee | |
| 2010/0097491 A1 | 4/2010 | Farina et al. | |
| 2010/0149393 A1 | 6/2010 | Zarnowski et al. | |
| 2010/0195912 A1 | 8/2010 | Nakada et al. | |
| 2010/0208082 A1 | 8/2010 | Buchner et al. | |
| 2010/0271469 A1 | 10/2010 | She | |
| 2010/0309333 A1 | 12/2010 | Smith et al. | |
| 2010/0309334 A1 | 12/2010 | James et al. | |
| 2010/0309335 A1 | 12/2010 | Brunner et al. | |
| 2011/0013807 A1 | 1/2011 | Lee et al. | |
| 2011/0043651 A1 | 2/2011 | Nonaka et al. | |
| 2011/0043691 A1 | 2/2011 | Guitteny et al. | |
| 2011/0052136 A1 | 3/2011 | Homan et al. | |
| 2011/0069189 A1 | 3/2011 | Venkataraman et al. | |
| 2011/0122315 A1 | 5/2011 | Schweiger et al. | |
| 2011/0199470 A1 | 8/2011 | Moller et al. | |
| 2011/0205433 A1 | 8/2011 | Altmann et al. | |
| 2012/0081579 A1 | 4/2012 | Doepke | |
| 2012/0105584 A1 | 5/2012 | Gallagher et al. | |
| 2012/0314901 A1 | 12/2012 | Hanson et al. | |
| 2013/0016251 A1 | 1/2013 | Ogasahara | |
| 2013/0057713 A1 | 3/2013 | Khawand | |
| 2013/0208138 A1 | 8/2013 | Li et al. | |
| 2013/0208143 A1 | 8/2013 | Chou et al. | |
| 2013/0271602 A1 | 10/2013 | Bentley et al. | |
| 2013/0314511 A1 | 11/2013 | Chen et al. | |
| 2014/0009634 A1 | 1/2014 | Hiwada et al. | |
| 2014/0063300 A1 | 3/2014 | Lin et al. | |
| 2014/0074265 A1 | 3/2014 | Arginsky et al. | |
| 2014/0085495 A1 | 3/2014 | Almalki et al. | |
| 2014/0089401 A1 | 3/2014 | Filev et al. | |
| 2014/0160326 A1 | 6/2014 | Black | |
| 2014/0232929 A1 | 8/2014 | Ichikawa | |
| 2014/0244617 A1 | 8/2014 | Rose | |
| 2014/0358473 A1 | 12/2014 | Goel et al. | |
| 2015/0170039 A1 | 6/2015 | Hostyn et al. | |
| 2015/0179223 A1 | 6/2015 | Leppanen et al. | |
| 2015/0195482 A1 | 7/2015 | Wise | |
| 2015/0271405 A1 | 9/2015 | Lameer et al. | |
| 2015/0288869 A1 | 10/2015 | Furuhashi | |
| 2015/0318020 A1 | 11/2015 | Pribula | |
| 2015/0341546 A1 | 11/2015 | Petrescu et al. | |
| 2015/0341547 A1 | 11/2015 | Petrescu et al. | |
| 2015/0341548 A1 | 11/2015 | Petrescu et al. | |
| 2015/0341549 A1 | 11/2015 | Petrescu et al. | |
| 2015/0341550 A1 | 11/2015 | Lay | |
| 2015/0341561 A1 | 11/2015 | Petrescu et al. | |
| 2016/0037055 A1 | 2/2016 | Waddington | |
| 2016/0050354 A1 | 2/2016 | Musatenko et al. | |
| 2016/0080626 A1 | 3/2016 | Kovtun et al. | |

FOREIGN PATENT DOCUMENTS

| | | |
|---|---|---|
| EP | 2852147 | 3/2015 |
| JP | 2006140892 | 6/2006 |
| KR | 10-2007-0005947 | 1/2007 |
| WO | WO-2005099251 | 10/2005 |
| WO | WO-2007128114 | 11/2007 |
| WO | WO-2010068175 | 6/2010 |
| WO | WO-2012166044 | 12/2012 |
| WO | WO-2013172335 | 11/2013 |

OTHER PUBLICATIONS

"Notice of Allowance", U.S. Appl. No. 13/468,098, dated Mar. 23, 2016, 8 pages.

"Notice of Allowance", U.S. Appl. No. 14/218,194, dated Feb. 26, 2016, 5 pages.

"Notice of Allowance", U.S. Appl. No. 14/448,199, dated Apr. 5, 2016, 10 pages.

"Notice of Allowance", U.S. Appl. No. 14/457,374, dated Feb. 10, 2016, 15 pages.

"Notice of Allowance", U.S. Appl. No. 14/487,785, dated Feb. 1, 2016, 9 pages.

"Restriction Requirement", U.S. Appl. No. 14/450,461, dated Jan. 20, 2016, 6 pages.

"Final Office Action", U.S. Appl. No. 13/468,098, dated Sep. 18, 2015, 16 pages.

"International Preliminary Report on Patentability", Application No. PCT/US2013/040347, dated Nov. 20, 2014, 6 pages.

"International Search Report and Written Opinion", Application No. PCT/US2015/018869, dated May 20, 2015, 10 pages.

"International Search Report and Written Opinion", Application No. PCT/US2013/040437, dated Jul. 23, 2013, 9 pages.

"International Search Report and Written Opinion", Application No. PCT/US2015/023238, dated Jun. 22, 2015, 11 pages.

"International Search Report and Written Opinion", Application No. PCT/US2015/023250, dated Jun. 22, 2015, 12 pages.

"International Search Report and Written Opinion", Application No. PCT/US2015/023241, dated Jun. 23, 2015, 12 pages.

"New BLINK Apps Even More Creative", Retrieved from: http://research.microsoft.com/en-us/news/features/blink-061813.aspx, Jun. 18, 2013, 4 pages.

"Non-Final Office Action", U.S. Appl. No. 13/468,098, dated Mar. 2, 2015, 14 pages.

"Non-Final Office Action", U.S. Appl. No. 14/218,194, dated Sep. 11, 2015, 7 pages.

"Non-Final Office Action", U.S. Appl. No. 14/448,199, dated Sep. 17, 2015, 14 pages.

"Non-Final Office Action", U.S. Appl. No. 14/450,573, dated Dec. 23, 2015, 10 pages.

"Non-Final Office Action", U.S. Appl. No. 14/457,374, dated Nov. 13, 2015, 12 pages.

"Non-Final Office Action", U.S. Appl. No. 14/487,785, dated Sep. 25, 2015, 8 pages.

"Powershot SX700HS Camera User Guide", Retrieved from the Internet: http://gdlp01.c-wss.com/gds/7/0300014407/02/PowerShot_SX700HS_Camer_User_Guide_EN.pdf, Mar. 29, 2014, 196 pages.

"Restriction Requirement", U.S. Appl. No. 14/450,390, dated Dec. 16, 2015, 6 pages.

(56) References Cited

OTHER PUBLICATIONS

"Restriction Requirement", U.S. Appl. No. 14/450,522, dated Dec. 24, 2015, 6 pages.
"Restriction Requirement", U.S. Appl. No. 14/450,553, dated Jan. 7, 2016, 6 pages.
"Restriction Requirement", U.S. Appl. No. 14/450,573, dated Sep. 1, 2015, 6 pages.
Dexter,"Multi-view Synchronization of Human Actions and Dynamic Scenes", In Proceedings British Machine Vision Conference, 2009, 11 pages.
Whitehead,"Temporal Synchronization of Video Sequences in Theory and in Practice", Proceedings of the IEEE Workshop on Motion Video Computing, 2005, 6 pages.
"Notice of Allowance", U.S. Appl. No. 14/450,573, dated Sep. 29, 2016, 11 pages.
"Advisory Action", U.S. Appl. No. 14/450,573, dated Aug. 26, 2016, 3 pages.
"Corrected Notice of Allowance", U.S. Appl. No. 14/487,785, dated May 3, 2016, 4 pages.
"Final Office Action", U.S. Appl. No. 14/450,573, dated May 19, 2016, 12 pages.
"Non-Final Office Action", U.S. Appl. No. 14/450,461, dated May 6, 2016, 9 pages.
"Non-Final Office Action", U.S. Appl. No. 14/450,522, dated May 5, 2016, 13 pages.
"Non-Final Office Action", U.S. Appl. No. 14/450,553, dated May 31, 2016, 12 pages.
"Restriction Requirement", U.S. Appl. No. 14/450,492, dated Jun. 27, 2016, 6 pages.
"Supplemental Notice of Allowance", U.S. Appl. No. 14/218,194, dated May 3, 2016, 2 pages.
"Final Office Action", U.S. Appl. No. 14/450,390, dated Oct. 31, 2016, 11 pages.
"Final Office Action", U.S. Appl. No. 14/450,461, dated Nov. 17, 2016, 10 pages.
"Final Office Action", U.S. Appl. No. 14/450,522, dated Nov. 15, 2016, 10 pages.
"Non-Final Office Action", U.S. Appl. No. 14/450,492, dated Jan. 5, 2017, 8 pages.
"Notice of Allowance", U.S. Appl. No. 14/450,553, dated Dec. 15, 2016, 9 pages.
"Corrected Notice of Allowance", U.S. Appl. No. 14/487,785, dated Apr. 19, 2017, 4 pages.

* cited by examiner

IMAGER MODULE WITH ELECTRONIC SHUTTER

FIELD OF THE INVENTION

The field of the invention relates to imaging devices and more particularly to cameras.

BACKGROUND OF THE INVENTION

An imaging device such as a camera requires at least three things. First, a light sensitive medium is required. In the past, the light sensitive medium has been photographic film. Recently, however, photographic film has been increasingly been supplanted with two dimensional arrays of photodetectors.

The second thing required by a camera is a lens and enclosure for limiting the light impinging upon the light sensitive medium from unintended directions and for focusing an image from an image source onto the light sensitive medium. The lens may be either of a fixed focus design or variable focus to accommodate near or distant image sources.

The final thing required of a camera is a shutter to limit the time length of exposure of the image sensitive medium to light from the image source. In the case of photographic film, the control of the time of exposure is critical to forming a sharp image. If the shutter remained open too long, then the film would be overexposed and of little value. If the shutter open time was too short, then the film would be underexposed and also of little value.

The use of an array of photodiodes as a light sensitive material does not change the criticality of shutter open time. Once more, if the shutter is open too long, then the image formed within the array is overexposed. If the shutter is not open long enough, then the image is underexposed.

Prior art shutters typically include a light control device that physically moves into and out of a light path to expose the light sensitive medium and a timing device. The light control device is usually made of one or more metal leafs and a mechanism to quickly move the metal leafs between an open and closed position. The timer may also be mechanical or may be some sort of electrically activated device the moves the metal leafs between the open and closed positions.

While prior art mechanical shutters perform well under most situations, they tend to be relatively large, expensive to make and suffer from reliability problems. Accordingly, a need exists for a more reliable shutter for use with compact cameras.

SUMMARY

A method and apparatus are provided for operating a camera. The method includes the steps of providing an array of image sensing pixels, disposing an electronic shutter in an optical path between the array of pixels and an image where the electronic shutter has a reflective state and a transmissive state and applying a predetermined sequence of electrical signals to the electronic shutter to expose the image sensing pixels to the image.

In another aspect, the electronic shutter reflects the image onto the array of pixels from a first side of the electronic shutter during a pixel exposure portion of the predetermined sequence.

In another aspect, a pixel exposure portion of the sequence includes deactivating the electronic shutter.

In another aspect, the predetermined sequence of signals further includes applying a reset electric signal to the array of pixels.

In another aspect, the electronic shutter enters the transmissive state to terminate exposure.

In another aspect, the predetermined sequence of signals further includes applying an electric signal to the electronic shutter to terminate exposure of the array of pixels to the reflected image.

In another aspect, the sequence includes disposing a light absorbing material on a second side of the electronic shutter to absorb the image when the electronic shutter is in the transmissive state.

In another aspect, a cellular telephone camera is provided that includes an array of image sensors and an electronic shutter that exposes the array of image sensors to the image disposed in an optical path between an image and the array of sensors.

In another aspect, the electronic shutter further includes a transmissive state and a reflective state.

In another aspect, the array of image sensors are exposed during the reflective state.

In another aspect, the array of image sensors are exposed during the transmissive state.

In another aspect, a controller is provided that opens the shutter to expose the pixels for a predetermined time period.

In another aspect, a method of operating a camera is provided that includes the steps of providing an array of image sensing pixels, disposing a liquid crystal shutter adjacent to the array of pixels where the liquid crystal shutter has a reflective state and a transmissive state, activating the liquid crystal shutter to expose the image sensing pixels and thereby form an image and deactivating the liquid crystal shutter after a predetermined time period.

In another aspect, a camera is provided that includes an array of image sensing pixels, an electronic shutter disposed in a light path between the array of pixels and an image where the electronic shutter has a reflective state and a transmissive state and a predetermined sequence of electrical signals applied to the electronic shutter to expose the image sensing pixels with the image.

In another aspect, the electronic shutter further includes a liquid crystal device.

In another aspect, the optical path further includes the electronic shutter disposed adjacent the image sensing pixels so that the image is reflected from a first side of the electronic shutter onto the image sensing pixels.

In another aspect, a light absorbing material is disposed on a second side of the electronic shutter.

In another aspect, the optical path further includes the electronic shutter disposed between the image and the image sensing pixels.

In another aspect, a camera is provided that includes an array of image sensing pixels, a liquid crystal shutter disposed in a light path between the array of pixels and image where the electronic shutter has a reflective state and a transmissive state and a controller that opens the liquid crystal shutter for a predetermined time period.

In another aspect, a predetermined sequence of electrical signals is applied by the controller to the electronic shutter to capture an image within the array of pixels.

In another aspect, the predetermined sequence further includes an electrical signal applied to the electronic shutter to open the shutter to expose the array of pixels.

In another aspect, the predetermined sequence further includes an electrical signal applied to the electronic shutter to close the electronic shutter.

In another aspect, the electronic shutter is disposed between a set of imaging lens.

In another aspect, the electronic shutter is disposed between a set of imaging lens and the imager array.

In another aspect, a light absorbing material is disposed on one side of the liquid crystal shutter.

DETAILED DESCRIPTION OF AN ILLUSTRATED EMBODIMENT

Figure 1:
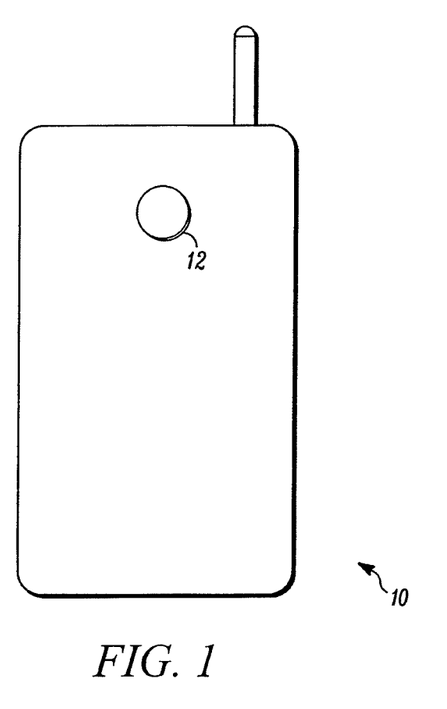
FIG. 1 depicts a camera disposed within a cellular telephone in accordance with an illustrated embodiment of the invention.

FIG. 1 is a front view of a camera 12 shown generally in accordance with an illustrated embodiment of the invention. In one particular illustrated embodiment, the camera 12 is mounted within a cellular telephone 10.

Figure 2:
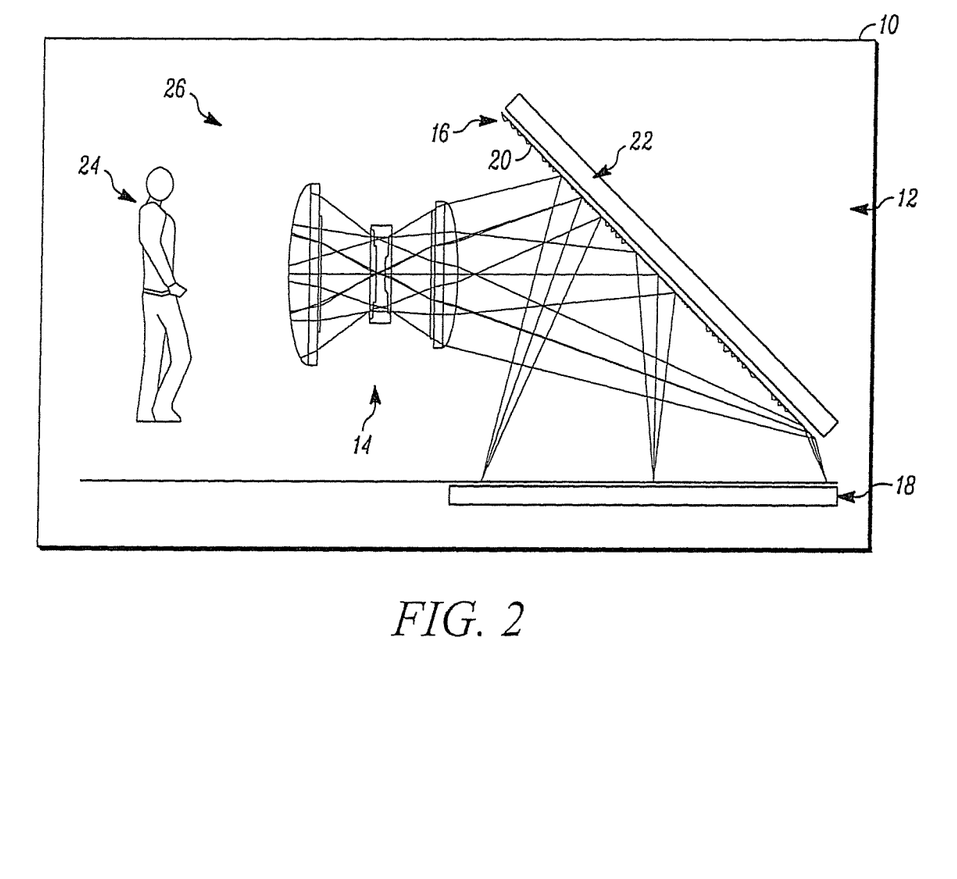
FIG. 2 depicts the camera of FIG. 1 with the shutter in a reflective state.

FIG. 2 is a schematic of the camera 12. Included within the camera 12 of FIG. 2 is a lens assembly 14, an electronic shutter 16 and an image sensor 18. The lens assembly 14 and electronic shutter 16 are disposed in an optical path 26 between an image source 24 and an image sensor 18.

As used herein, an electronic shutter means a light transmitting/blocking device that is activated by an electric field alone. That is, the electronic shutter has no moving parts.

Under a first embodiment, the electronic shutter 16 has an area of about 1/50 in$^2$ and includes a light directing layer 20 and a light absorbing layer 22. The light directing layer 20 may be fabricated from a liquid crystal display (LCD) material that has the characteristic of being transparent to light when an electric field is applied to the light directing layer 20 and reflective when the electric field is removed from the light directing layer 20.

The light absorbing layer 22 may simply be a material that absorbs light. The light absorbing layer 22 may simply be a black fabric or coating of light absorbing material (e.g., carbon black) disposed over a rear surface of the light directing layer 20.

The image sensor 18 may be a two-dimensional array of photodetectors of about 0.14 inches on a side and having an area of about 1/50 in$^2$. The image sensor 18 and electronic shutter 16 may operate under control of an imaging control system 100.

Figure 7:
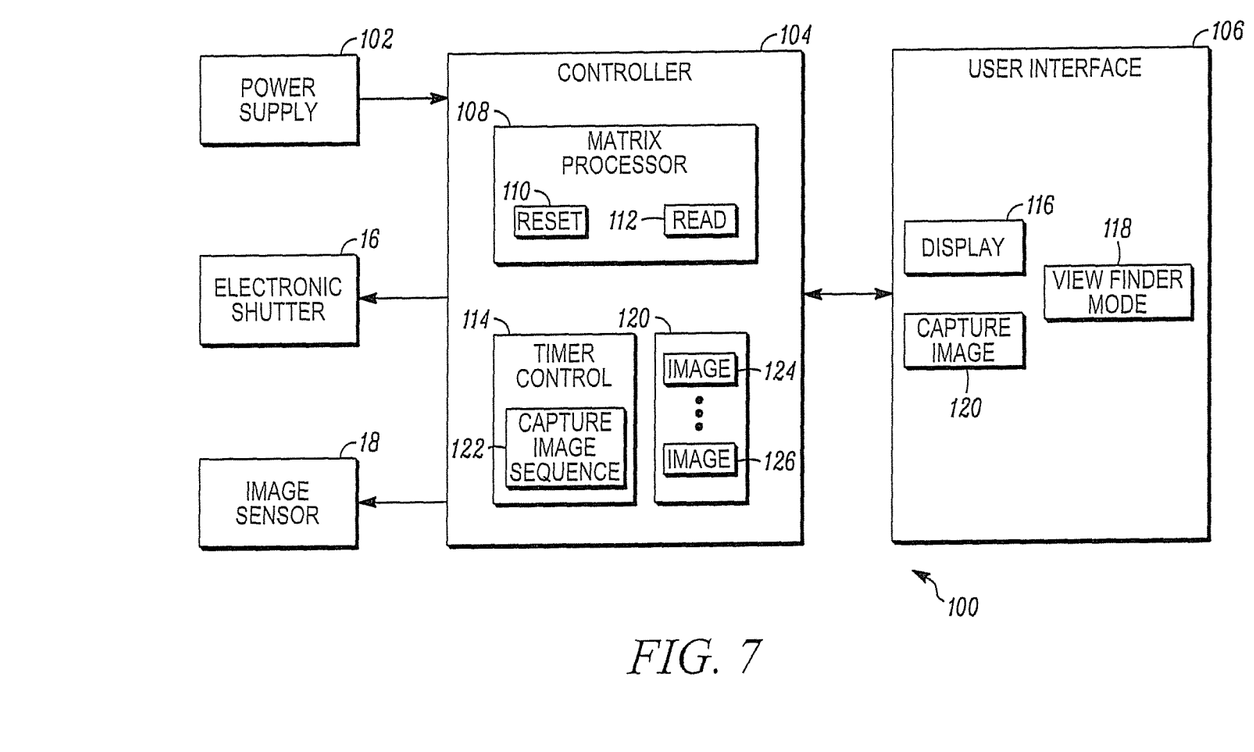
FIG. 7 is an electronic control block diagram of the camera of FIG. 1.

FIG. 7 is a block diagram of the image control system 100. The image control system 100 includes an image controller 104 that operates in response to input received from a user interface 106 to captures images from the image sensor 18 via operation of the electronic shutter 16.

As shown in FIG. 7, a matrix processor 108 may be provided within the imaging controller 104 to retrieve pixel information from the image sensor 18. In this regard, the matrix processor 108 may generate a set of control signals that are applied to the rows and columns of the image sensor 18 to read a light level detected by the individual photodiodes (hereinafter referred to as "pixels") of the image sensor 18.

In a similar manner, the electronic shutter 16 is also controlled by the controller 104 through a user interface 106. In this case, a user may select either a viewfinder mode softkey 118 or a capture image softkey 120. In the viewfinder mode, the controller 104 may generate an electrical signal to open the electronic shutter 16. The controller 104 may also activate a read subroutine 112 that reads the image sensor 18 using a rolling shutter mode where a small number of pixels (e.g., one in four) are reset and then read to create a real time image on a display 116.

If the user should select the capture image mode softkey 120, then the controller 104 may activate a timer control processor 114 to execute a capture image sequence 122. In this regard the timer control processor 114 may calculate an exposure time based upon an exposure rate determined from a light level detected during the viewfinder mode. The timer control processor 114 may then execute the exposure or image capture sequence 122. The exposure sequence 122 may include a first program step of resetting each pixel of the diode array 18, a second step of opening the electronic shutter 16 for the determined time, a third step of closing the electronic shutter 16, a fourth step of reading the pixel values from the diode array 18 as discussed above.

As used herein, the term "opening the shutter" means causing the electronic shutter 16 to expose the diode array 18. In the case of FIG. 2, exposing the image array 18 occurs by light from an image 24 passing though the lens assembly 14 and being reflected from the electronic shutter 16 onto the image array 18. Since the light directing layer 20 must be in the reflective state to reflect light onto the image array, opening the shutter in the context of FIG. 2 means removing an electric field from the light directing layer 20. Removing the electric field from the electronic shutter 16, as mentioned above, causes the electronic shutter 16 to become reflective.

After the determined time for exposure, the control processor 114 closes the electronic shutter 16. In the context of FIG. 2, closing the shutter 16 means applying an electric field to the light directing layer 20.

Figure 3:
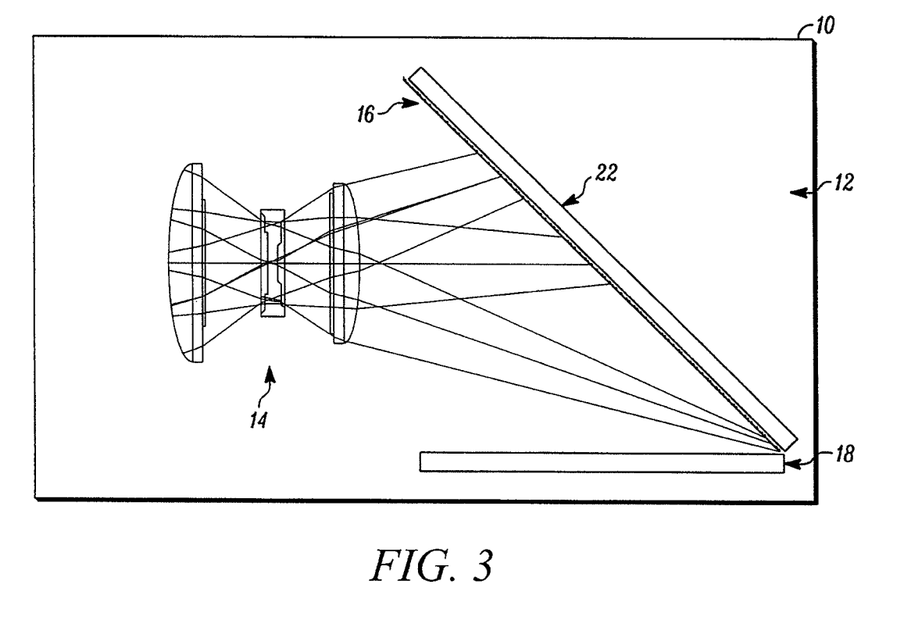
FIG. 3 depicts the camera of FIG. 1 with the shutter in a transmissive state.

Upon application of an electric field to the light directing layer 20, the light directing layer enters a transmissive state (FIG. 3). The transition time of the electronic shutter 16 from the reflective state to the transmissive state is less than 5 msec. When the light directing layer 20 enters the transmissive state, the light from the image 24 passes through the light directing layer 20 and is absorbed by the light absorbing layer 22.

Once the electronic shutter 16 is closed, the read processor 112 reads the pixels values from the image array 18 and saves the image in an image file (124 or 126) within a memory 128. The read processor 112 may also display the image from the display 116.

Figure 4:
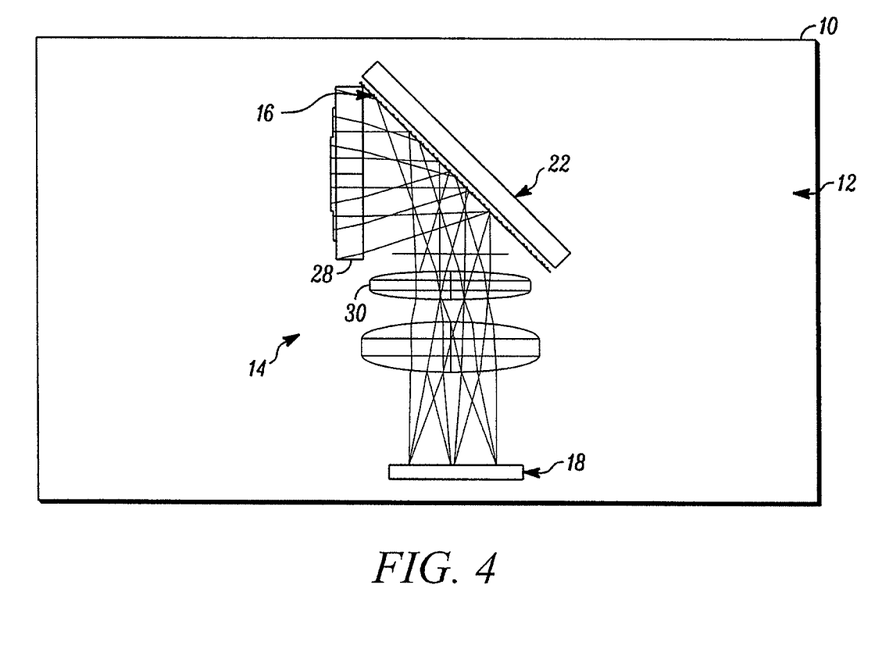
FIG. 4 depicts the camera of FIG. 1 under an alternate embodiment.

In another embodiment, the electronic shutter 16 is disposed between first lens 28 and second lens 30 of the lens assembly 14 as shown in FIG. 4. Placing the electronic shutter 16 between the first and second lens 28, 30 allows the optical path 26 to be made shorter, thus creating a more compact camera 12.

Figure 5:
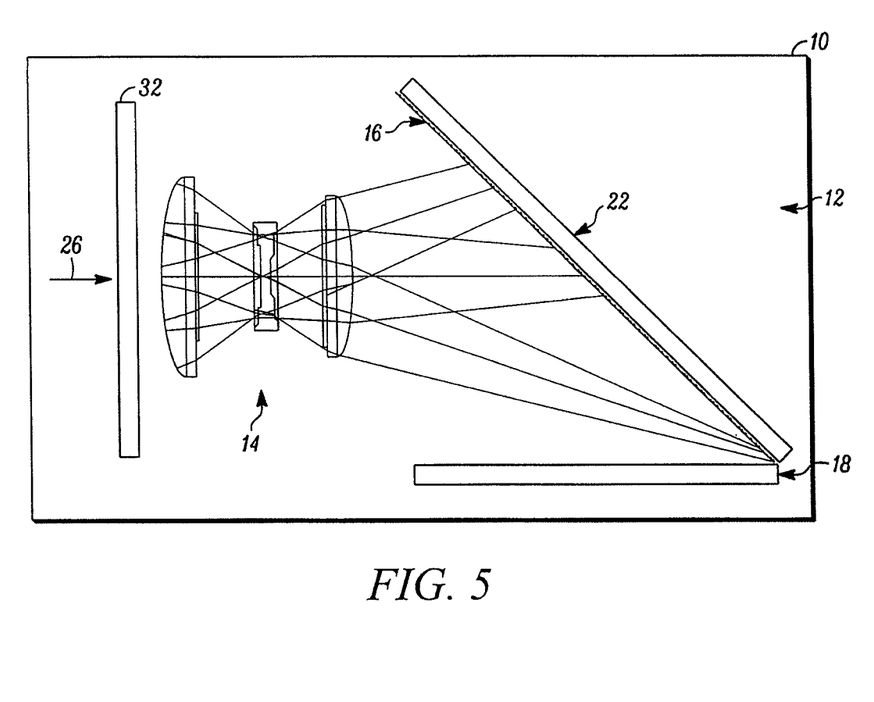
FIG. 5 depicts the camera of FIG. 1 under another alternate embodiment.

In another embodiment (FIG. 5), an iris diaphragm 32 is provided in the optical path 26. The iris 32 functions to adjust the amount of light reaching the image sensor 18. Under low lighting conditions the iris diaphragm 32 is mostly or completely open to allow the maximum amount of light to reach the image sensor 18. Under bright lighting conditions the iris diaphragm 32 is mostly closed thereby blocking most of the light from reaching the image sensor 18. The iris functioning in this manner allows for the overall camera 12 to be able to operate over a wider range of lighting conditions.

Figure 6:
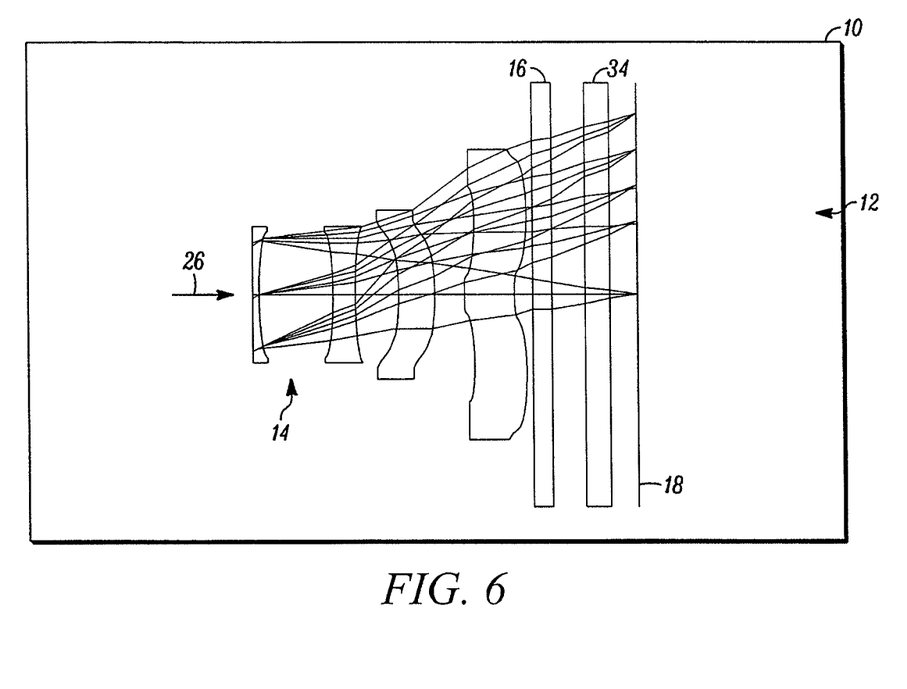
FIG. 6 depicts the camera of FIG. 1 under a fourth alternate embodiment.

In another embodiment, shown in FIG. 6, the camera 12 is assembled in an axial arrangement in which the optical path 26 follows a straight line. In this case, opening the electronic shutter 16 involves imposing an electric field on the electronic shutter 16. Imposing an electric field on the electronic shutter 16 causes the shutter 16 to become transparent thereby allowing the diode array of the image sensor 18 to become exposed. Similarly, closing the shutter 16 means removing the electric field. An infrared (IR) filter 34 is also provided to improve the sensitivity of the image sensor to visible light.

Figure 8:
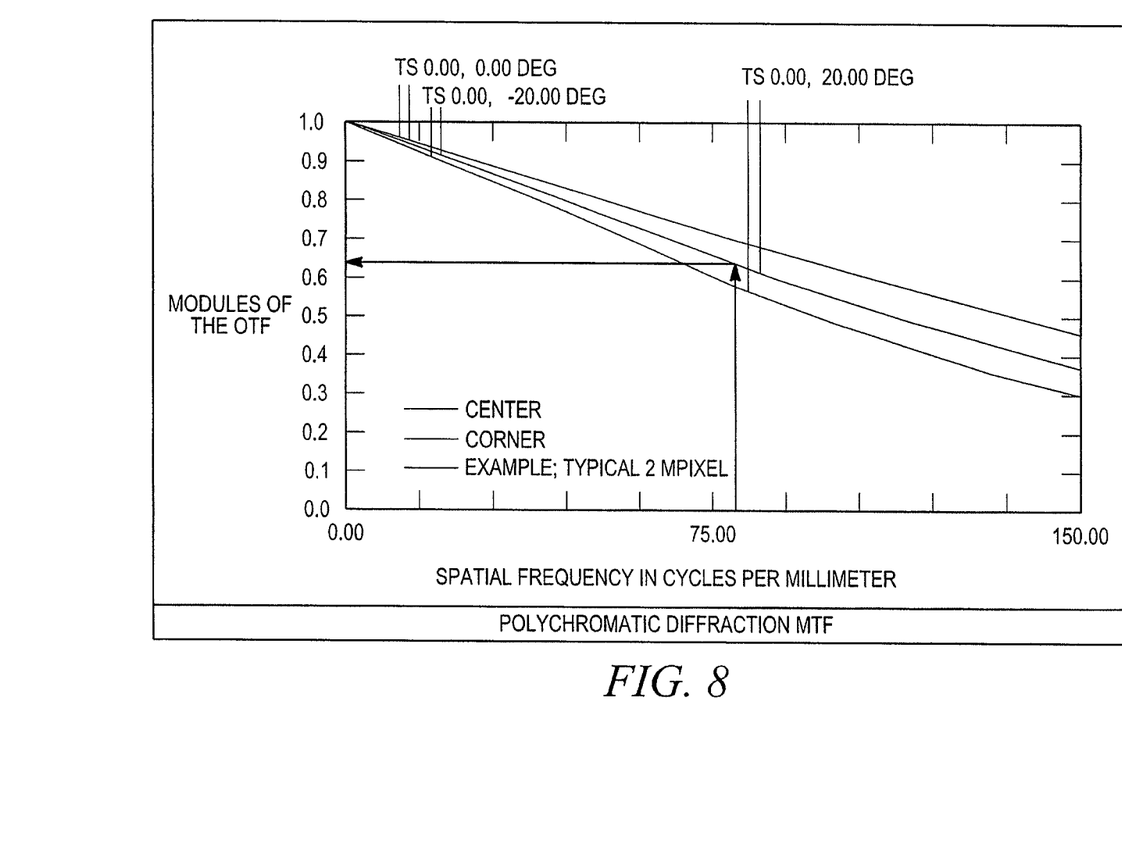
FIG. 8 shows modulation transfer function test results for the camera of FIG. 1.

FIG. 8 depicts the modulation transfer function for the camera 12 shown in FIGS. 2 and 3. As is known, the modulation transfer function is a standard test to see how well alternating white and black lines show up within an image. As shown in FIG. 8, the blur of an image created by the camera 12 of FIGS. 2 and 3 is relatively small with minor differences between the center and edges of the image, as tested with a 2 mega-pixel image sensor 18.

Figure 9:
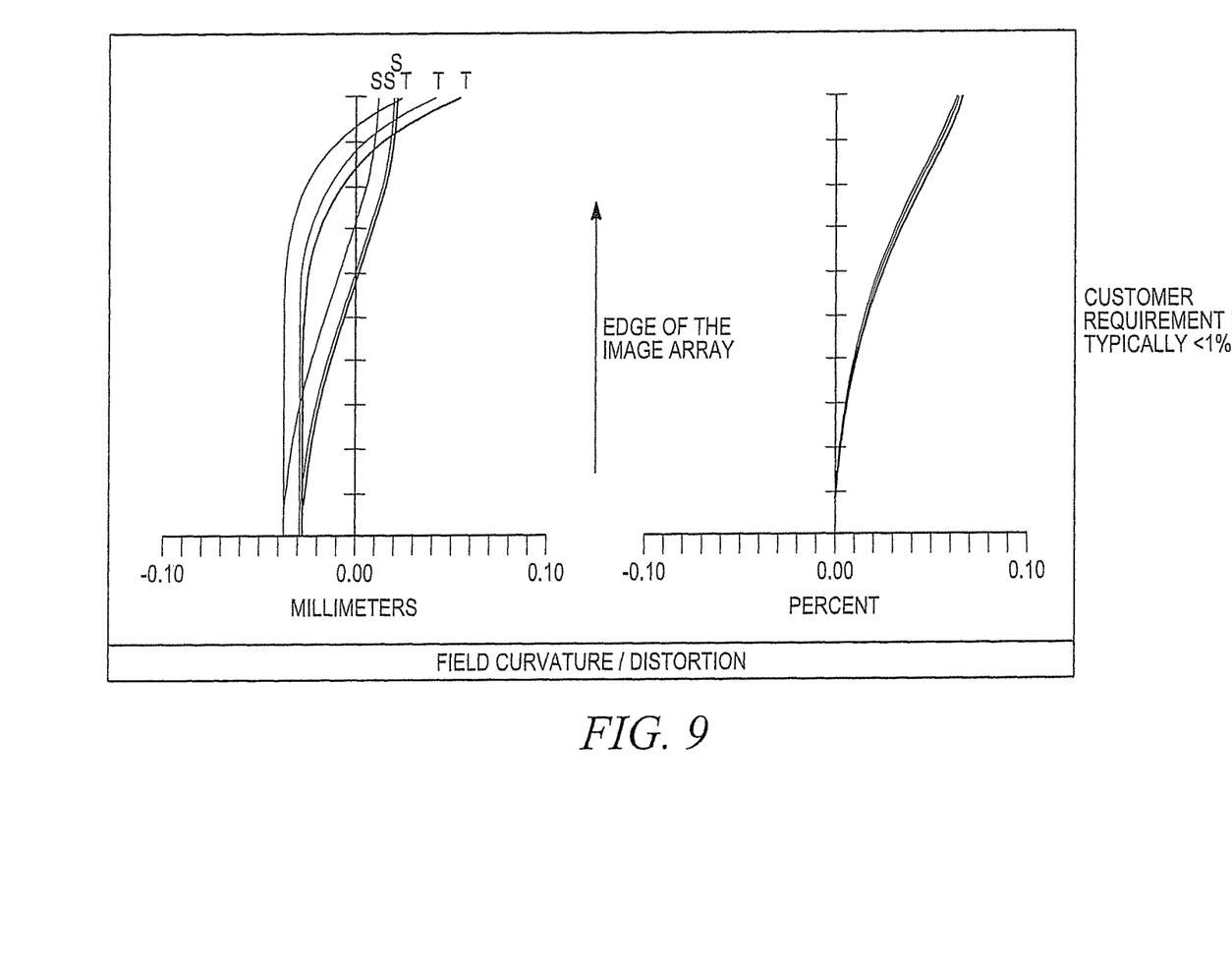
FIG. 9 shows TV distortion test results for the camera of FIG. 1.

FIGS. 9*a-b* show TV distortion of the camera 12 of FIGS. 2 and 3. As shown, the distortion within a normal range of operation clearly meets the requirement of being below 1%.

A specific embodiment of method and apparatus for providing an electronic shutter has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a camera comprising:
providing an array of image sensing pixels;
disposing an electronic shutter in an optical path between the array of pixels and an image where the electronic shutter includes a light directing layer formed from a liquid crystal display (LCD) that is responsive to application and removal of an electric field to transition between having a reflective characteristic and having a transparent characteristic;
absorbing light from the image when the electric field is applied to the light directing layer, the application of the electric field causing the LCD to have the transparent characteristic when the electric field is applied so that the light from the image passes through the LCD having the transparent characteristic and is absorbed within a light absorbing layer after passing through the LCD having the transparent characteristic; and
removing the electric field from the light directing layer of the electronic shutter to transition the LCD to have the reflective characteristic when the electric field is removed so that the LCD having the reflective characteristic reflects light incident upon the LCD from the image away from the electronic shutter and onto the image sensing pixels to expose the image sensing pixels to the image.

2. The method of operating the camera as in claim 1, further comprising applying a predetermined sequence of electrical signals.

3. The method of operating the camera as in claim 2, wherein a pixel exposure portion of the predetermined sequence of electrical signals comprises deactivating the electronic shutter.

4. The method of operating the camera as in claim 2, wherein applying the predetermined sequence of signals includes applying a reset electric signal to the array of pixels.

5. The method of operating the camera as in claim 1, further comprising causing the LCD to have the transparent characteristic to terminate exposure.

6. The method of operating the camera as in claim 5, further comprising applying an electric signal to the light directing layer of the electronic shutter to terminate exposure of the array of pixels to the reflected image.

7. The method of operating the camera as in claim 6, further comprising disposing a light absorbing material on a second side of the electronic shutter to absorb the image when the LCD has the transparent characteristic.

8. A cellular telephone camera comprising:
an array of image sensors;
an electronic shutter disposed in an optical path between an image and the array of sensors, the electronic shutter having a light directing layer fabricated from a liquid crystal display (LCD) that is responsive to application and removal of an electric field to transition between having a reflective characteristic and a transparent characteristic;
the LCD configured to:
allow light to pass through when the LCD has the transparent characteristic as a result of the application of the electric field; and
reflect light from the image that is incident upon the LCD having the reflective characteristic away from the electronic shutter and onto the image sensing pixels to expose the array of image sensors to the image, the LCD having the reflective characteristic to reflect the light from the image as a result of the removal of the electric field; and
a light absorbing layer disposed on a light exiting side of the light directing layer and configured to absorb the light that has passed through the LCD when the LCD has the transparent characteristic.

9. The camera as in claim 8, wherein the array of image sensors is configured to be exposed when the LCD has the reflective characteristic.

10. The camera as in claim 8, wherein the array of image sensors is configured not to be exposed when the LCD has the transparent characteristic.

11. The camera as in claim 8, further comprising a controller configured to open the shutter to expose the pixels for a predetermined time period.

12. A method of operating a camera comprising:
providing an array of image sensing pixels;
disposing a liquid crystal shutter adjacent the array of pixels where the liquid crystal shutter includes a light directing layer fabricated from a liquid crystal display (LCD) that is responsive to application and removal of an electric field to transition between having a reflective characteristic and having a transparent characteristic;

disposing an iris diaphragm in an optical path between the liquid crystal shutter and an image, the iris diaphragm adjusting based on lighting conditions to allow an amount of light to pass through and reach the liquid crystal shutter;

absorbing light that passes through the iris diaphragm when the electric field is applied to the light directing layer, the application of the electric field causing the LCD to have the transparent characteristic so that the light passes through the LCD having the transparent characteristic and is absorbed within a light absorbing layer after passing through the LCD having the transparent characteristic;

activating the liquid crystal shutter with the removal of the electric field from the light directing layer;

in response to activating the liquid crystal shutter with the removal of the electric field, the LCD having the reflective characteristic to reflect light that passes through the iris diaphragm and is incident on the LCD having the reflective characteristic away from the liquid crystal shutter and onto the array of image sensing pixels to expose the image sensing pixels and thereby form the image; and deactivating the liquid crystal shutter after a predetermined time period.

13. A camera comprising:
an array of image sensing pixels;
an electronic shutter disposed in a light path between the array of pixels and an image where the electronic shutter includes a light directing layer formed from a liquid crystal display (LCD) that is responsive to application and removal of an electric field to transition between having a reflective characteristic and having a transparent characteristic;
the LCD configured to:
  allow light to pass through when the LCD has the transparent characteristic as a result of the application of the electric field; and
  reflect light from the image that is incident upon the LCD having the reflective characteristic away from the electronic shutter and onto the array of image sensing pixels to expose the image sensing pixels with the image, the LCD having the reflective characteristic to reflect the light from the image as a result of the removal of the electric field;
an iris diaphragm disposed in the light path between the image and the light directing layer, the iris diaphragm configured to adjust based on lighting conditions to allow an amount of the light from the image to pass through to reach the LCD of the light directing layer; and a light absorbing layer configured to absorb the light from the image when the LCD has the transparent characteristic and after the light has passed through the LCD having the transparent characteristic.

14. The camera of claim 13, wherein the electronic shutter is disposed in the light path adjacent the image sensing pixels so that the image is reflected from the LCD having the reflective characteristic at a first side of the electronic shutter onto the image sensing pixels.

15. The camera of claim 14, wherein the light absorbing layer comprises a light absorbing material disposed on a second side of the electronic shutter.

16. The camera of claim 13, wherein the electronic shutter is disposed in the light path between the image and the image sensing pixels.

17. A camera comprising:
an array of image sensing pixels;
a liquid crystal shutter disposed in a light path between the array of pixels and an image, the liquid crystal shutter including a light directing layer fabricated from a liquid crystal display (LCD) that is responsive to application and removal of an electric field to change between having a reflective characteristic and having a transparent characteristic;
a light absorbing layer that absorbs light from the image when the LCD has the transparent characteristic and after the light has passed through the LCD having the transparent characteristic, the LCD having the transparent characteristic as a result of the electric field being applied to the LCD; and
a controller that controls the liquid crystal shutter by removing the electric field to cause the LCD to have the reflective characteristic so that the LCD having the reflective characteristic reflects light incident on the LCD away from the liquid crystal shutter and onto the array of image sensing pixels for a predetermined time period.

18. The camera of claim 17, wherein a predetermined sequence of electrical signals are applied by the controller to the LCD to capture an image within the array of pixels.

19. The camera of claim 18, wherein the predetermined sequence further comprises an electrical signal applied to the LCD to close the liquid crystal shutter.

20. The camera of claim 17, wherein the liquid crystal shutter is disposed between a set of imaging lens.

21. The camera of claim 17, wherein the liquid crystal shutter is disposed between a set of imaging lens and the image sensing pixels.

22. The camera of claim 17, wherein the light absorbing layer comprises a light absorbing material disposed on one side of the liquid crystal shutter.

* * * * *